(12) United States Patent
Zhang et al.

(10) Patent No.: US 12,731,196 B2
(45) Date of Patent: Sep. 8, 2026

(54) FUSING MULTIMODAL ENVIRONMENTAL DATA FOR AGRICULTURAL INFERENCE

(71) Applicant: Deere & Company, Moline, IL (US)

(72) Inventors: Yawen Zhang, Mountain View, CA (US); Kezhen Chen, San Mateo, CA (US); Jinmeng Rao, Sunnyvale, CA (US); Xiaoyuan Guo, Palo Alto, CA (US); Jie Yang, Sunnyvale, CA (US); Luis Pazos Outon, Mountain View, CA (US)

(73) Assignee: Deere & Company, Moline, IL (US)

( * ) Notice: Subject to any disclaimer, the term of this patent is extended or adjusted under 35 U.S.C. 154(b) by 151 days.

(21) Appl. No.: 18/374,568

(22) Filed: Sep. 28, 2023

(65) Prior Publication Data

US 2025/0148555 A1 May 8, 2025

(51) Int. Cl.
*G06Q 50/02* (2024.01)
*A01B 79/00* (2006.01)
(Continued)

(52) U.S. Cl.
CPC ........... *G06Q 50/16* (2013.01); *A01B 79/005* (2013.01); *G06Q 50/02* (2013.01); *G06V 20/188* (2022.01)

(58) Field of Classification Search
CPC ...... G06V 30/422; G06V 20/10; G06V 20/13; G06Q 50/02; G06T 17/05; G06T 2207/10032; G06N 5/04
See application file for complete search history.

(56) References Cited

U.S. PATENT DOCUMENTS 11,321,347 B1 * 5/2022 Clifford ................. G06Q 50/02
11,406,097 B2 8/2022 Sibley et al.
(Continued)

OTHER PUBLICATIONS

AWS, What are Embeddings in Machine Learning?, accessed Aug. 5, 2025 (Year: 2025).*
(Continued)

*Primary Examiner* — Daniel Vetter
(74) *Attorney, Agent, or Firm* — Hanley, Flight & Zimmerman, LLC

(57) ABSTRACT

Implementations are disclosed for fusing multiple modalities of data into a multimodal feature embedding and then processing the multimodal feature embedding using various downstream processes for training and/or inference purposes. In various implementations, multiple different modalities of agricultural data about an agricultural parcel may be obtained. Each modality of agricultural data may be processed based on a respective modality-specific encoder to generate a respective modality-specific embedding. The plurality of modality-specific embeddings may be processed based on a multimodal fusion machine learning model to generate a multimodal feature embedding that represents the agricultural parcel. In some implementations, the multimodal feature embedding may be processed using downstream computer process(es) to generate agricultural prediction(s) about the agricultural parcel. Additionally or alternatively, the multimodal feature embedding may be used to train the multimodal fusion model and/or the modality specific encoder(s).

20 Claims, 6 Drawing Sheets

(51) Int. Cl.
*G06Q 50/16* (2012.01)
*G06V 20/10* (2022.01)

(56) References Cited

U.S. PATENT DOCUMENTS

| | | | | |
|---|---|---|---|---|
| 2020/0126232 | A1* | 4/2020 | Guo | G06Q 50/02 |
| 2021/0118097 | A1 | 4/2021 | Guan et al. | |
| 2022/0061236 | A1 | 3/2022 | Guan et al. | |
| 2022/0343194 | A1* | 10/2022 | Louisell, III | G06N 20/00 |
| 2023/0091677 | A1* | 3/2023 | Brown | G06Q 50/02<br>702/2 |
| 2023/0165181 | A1* | 6/2023 | Scheiner | G06Q 50/02<br>47/1.41 |
| 2024/0144424 | A1* | 5/2024 | Ma | G06T 3/4053 |
| 2024/0203119 | A1* | 6/2024 | Ma | G06Q 50/02 |
| 2024/0212068 | A1* | 6/2024 | Qian | G06Q 50/02 |

OTHER PUBLICATIONS

Geeks for Geeks, What are Embedding in Machine Learning?, accessed Aug. 5, 2025 (Year: 2025).*
Fuller, et al., Transfer learning with pretrained remote sensing transformers, arXiv preprint arXiv:2209.14969, 2022 (Year: 2022).*
Moumni, et al., Machine learning-based classification for crop-type mapping using the fusion of high-resolution satellite imagery in a semiarid area, Scientifica vol. 2021, No. 1, 2021, 8810279 (Year: 2021).*
Shen, et al., Missing data imputation for solar yield prediction using temporal multi-modal variational auto-encoder, Proceedings of the 29th ACM international conference on multimedia, 2021 (Year: 2021).*
Chlingaryan, et al., Machine learning approaches for crop yield prediction and nitrogen status estimation in precision agriculture: A review, Computers and Electronics in Agriculture, vol. 151, 2018, pp. 61-69 (Year: 2018).*
Andreadis, Missing values imputation on multivariate time series in the field of agriculture, Fac. Sci., School Inform., Aristotle Univ. Thessaloniki, Thessaloniki, Greece, 2022 (Year: 2022).*
Zhao, et al., Evaluation of five deep learning models for crop type mapping using sentinel-2 time series images with missing information, Remote Sensing, vol. 13, No. 14, 2021, 2790 (Year: 2021).*
Zheng, et al., Deep multisensor learning for missing-modality all-weather mapping, ISPRS Journal of Photogrammetry and Remote Sensing, vol. 174, 2021, pp. 254-264 (Year: 2021).*
Wang, Deep Neural Networks and Transfer Learning for Crop Phenotyping Using Multi-Modality Remote Sensing and Environmental Data, Diss. Purdue University, May 2023 (Year: 2023).*
He et al., "Masked Autoencoders Are Scalable Vision Learners" arXiv:2111.06377v3 [cs.CV], 14 pages, dated Dec. 19, 2021.
Ouhami et al., "Computer Vision, IoT and Data Fusion for Crop Disease Detection Using Machine Learning: A Survey and Ongoing Research" Remote Sens. 2021, 13, 2486. Retrieved from https://doi.org/10.3390/rs13132486.
Jayme Garcia Arnal Barbedo "Data Fusion in Agriculture: Resolving Ambiguities and Closing Data Gaps" Sensors 2022, 22, 2285. Retrieved from https://doi.org/10.3390/s22062285. 20 pages.
Yuxing Chen et al., Incomplete Multimodal Learning for Remote Sensing Data Fusion, Cornell University Library, 201 Olin Library Cornell University Ithaca, NY 14853, pp. 1-13, Apr. 22, 2023, XP091491336.
Chaoning Zhang et al., A Survey on Masked Autoencoder for Self-supervised Learning in Vision and Beyond, Cornell University Library, 201 Olin Library Cornell University Ithaca, NY 14853, pp. 1-13, Jul. 30, 2022, XP091284181.
Fudong Lin et al., MMST-ViT: Climate Change-aware Crop Yield Prediction via Multi-Modal Spatial-Temporal Vision Transformer, Cornell University Library, 201 Olin Library Cornell University Ithaca, NY 14853, Sep. 16, 2023, XP091615933.
Extended European Search Report and Written Opinion issued in European Patent Application No. 24203384.3 dated Mar. 5, 2025, in 09 pages.
Wang et al., "Prototype-based Selective Knowledge Distillation for Zero-Shot Sketch Based Image Retrieval," MM '22: Proceedings of the 30th ACM International Conference on Multimedia, Oct. 10, 2022, pp. 601-609, retrieved from <doi.org/10.1145/3503161.3548382> on Jul. 13, 2026, 9 pages.
Song et al., "Image Matching and Localization Based on Fusion of Handcrafted and Deep Features," IEEE Sensors Journal, vol. 23, No. 19, Oct. 1, 2023, pp. 22967-22983, retrieved from <doi.org/10.1109/JSEN.2023.3305677> on Jul. 13, 2026, 17 pages.
European Patent Office, "Communication Pursuant to Article 94(3) EPC," issued in connection with European Patent Application No. 24203384.3 dated Jun. 18, 2026, 32 pages.

* cited by examiner

TRAINING
TRAINING
240
TRAINING MODULE 122
MULTIMODAL FUSION MODULE 238
242
IMAGE ENCODER 236
TABULAR ENCODER 234
TIME-SERIES ENCODER 232B
TIME-SERIES ENCODER 232A
TERRAIN
SOIL PROPERTIES
SOIL MOISTURE
PREDICTED WEATHER
WEATHER DECODER 348
GROUND TRUTH
230

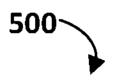

OBTAIN MULTIPLE DIFFERENT MODALITIES OF AGRICULTURAL DATA ABOUT AN AGRICULTURAL PARCEL
502

PROCESS EACH MODALITY OF AGRICULTURAL DATA BASED ON A RESPECTIVE MODALITY-SPECIFIC ENCODER TO GENERATE A RESPECTIVE EMBEDDING
504

PROCESS THE PLURALITY OF EMBEDDINGS BASED ON A MULTIMODAL FUSION MACHINE LEARNING MODEL TO GENERATE A MULTIMODAL FEATURE EMBEDDING THAT REPRESENTS THE AGRICULTURAL PARCEL
506

PROCESS THE MULTIMODAL FEATURE EMBEDDING USING ONE OR MORE DOWNSTREAM COMPUTER PROCESSES TO GENERATE ONE OR MORE AGRICULTURAL PREDICTIONS ABOUT THE AGRICULTURAL PARCEL
508

IDENTIFY REFERENCE MULTIMODAL FEATURE EMBEDDING(S) THAT ARE SUFFICIENTLY PROXIMATE TO MULTIMODAL FEATURE EMBEDDING IN EMBEDDING SPACE
508A

PROCESS THE MULTIMODAL FEATURE EMBEDDING USING A DOWNSTREAM MACHINE LEARNING MODEL TO PERFORM MULTI-CROP YIELD FORECASTING FOR THE AGRICULTURAL PARCEL
508B

CAUSE ONE OR MORE COMPUTING DEVICES TO RENDER OUTPUT THAT INCLUDES ONE OR MORE OF THE AGRICULTURAL PREDICTIONS
510

Fig. 5

FUSING MULTIMODAL ENVIRONMENTAL DATA FOR AGRICULTURAL INFERENCE

BACKGROUND

Remote sensing involves measuring reflected and emitted energy to obtain information about a surface. Satellite imagery depicting landmasses can be analyzed using techniques such as machine learning to make various predictions and/or classify terrain into different categories (generally, "inferences"). In the agricultural context, remote sensing can be employed to make agricultural inferences, such as crop type, tillage practice, soil type, crop health, crop yield, etc., based on satellite imagery.

Growers tend to grow crops that are suited to the particular conditions of the area in which the growers operate. Likewise, growers may seek new parcels of land with conditions that are suitable for the crops the growers would like to grow. These conditions include various environmental factors, such as terrain, climate, soil properties, and soil moisture, that are influential on the success of various types of crops.

SUMMARY

Implementations are described herein for fusing multiple modalities of data into a multimodal feature embedding and then processing the multimodal feature embedding using various downstream processes to make various predictions about a parcel of land. Additionally, techniques are described herein for a two-stage pre-training process that includes: (i) pre-training a plurality of modality-specific encoders, e.g., using masked autoencoding, to generate respective embeddings, and (ii) pre-training a multimodal fusion machine learning model, e.g., alone or jointly with the modality-specific encoders using masked autoencoding (which may or may not be cross-modal), to generate the aforementioned multimodal feature embedding about the parcel of land. While examples described herein relate primarily to the agricultural context, including making predictions about crop yields and/or suitable crops for agricultural parcels, this is not meant to be limiting. Techniques described herein may be applicable in other contexts in which multiple modalities of data are captured about areas of land.

In various implementations, a method may be implemented using one or more processors and may include: obtaining multiple different modalities of agricultural data about an agricultural parcel; processing each modality of agricultural data based on a respective modality-specific encoder to generate a respective embedding, wherein the respective modality-specific encoder is pre-trained for that modality using masked autoencoding; processing the plurality of embeddings based on a multimodal fusion machine learning model to generate a multimodal feature embedding that represents the agricultural parcel; processing the multimodal feature embedding using one or more downstream computer processes to generate one or more agricultural predictions about the agricultural parcel; and causing one or more computing devices to render output that includes one or more of the agricultural predictions.

In various implementations, the multimodal fusion machine learning model may be jointly trained with at least some of the modality-specific encoders. In various implementations, the multimodal machine learning model may be jointly trained using masked autoencoding.

In various implementations, the multimodal fusion machine learning model may include a transformer. In various implementations, the multiple different modalities of data may include at least one modality that comprises agricultural time series data about the agricultural parcel. In various implementations, the agricultural time series data about the agricultural parcel may include soil moisture data and/or climate data.

In various implementations, the multiple different modalities of data may include at least one modality that comprises tabular data about the agricultural parcel. In various implementations, the tabular data may include soil properties of the agricultural parcel. In various implementations, the multiple different modalities of data may include at least one modality that comprises satellite or aerial imagery of the agricultural parcel.

In various implementations, one or more of the downstream computer processes may include identifying one or more reference multimodal feature embeddings that are sufficiently proximate to the multimodal feature embedding in embedding space. In various implementations, the one or more reference multimodal feature embeddings may have been generated by processing multiple different modalities of agricultural data about one or more reference agricultural parcels. In various implementations, the output may include a recommendation of a suitable crop for the agricultural parcel, wherein the suitable crop is selected based on having been grown in one or more of the identified reference agricultural parcels. In various implementations, one or more of the downstream computer processes may include processing the multimodal feature embedding using a downstream machine learning model to perform multi-crop yield forecasting for the agricultural parcel.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Yet other implementations include agricultural vehicles, such as robots, that are equipped with edge processor(s) configured to carry out selected aspects of the present disclosure.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 5 is a flowchart of an example method of applying a trained in-season prediction transformer to less than an entire crop cycle of data to make agricultural predictions, in accordance with various implementations described herein.

DETAILED DESCRIPTION

Figure 1:
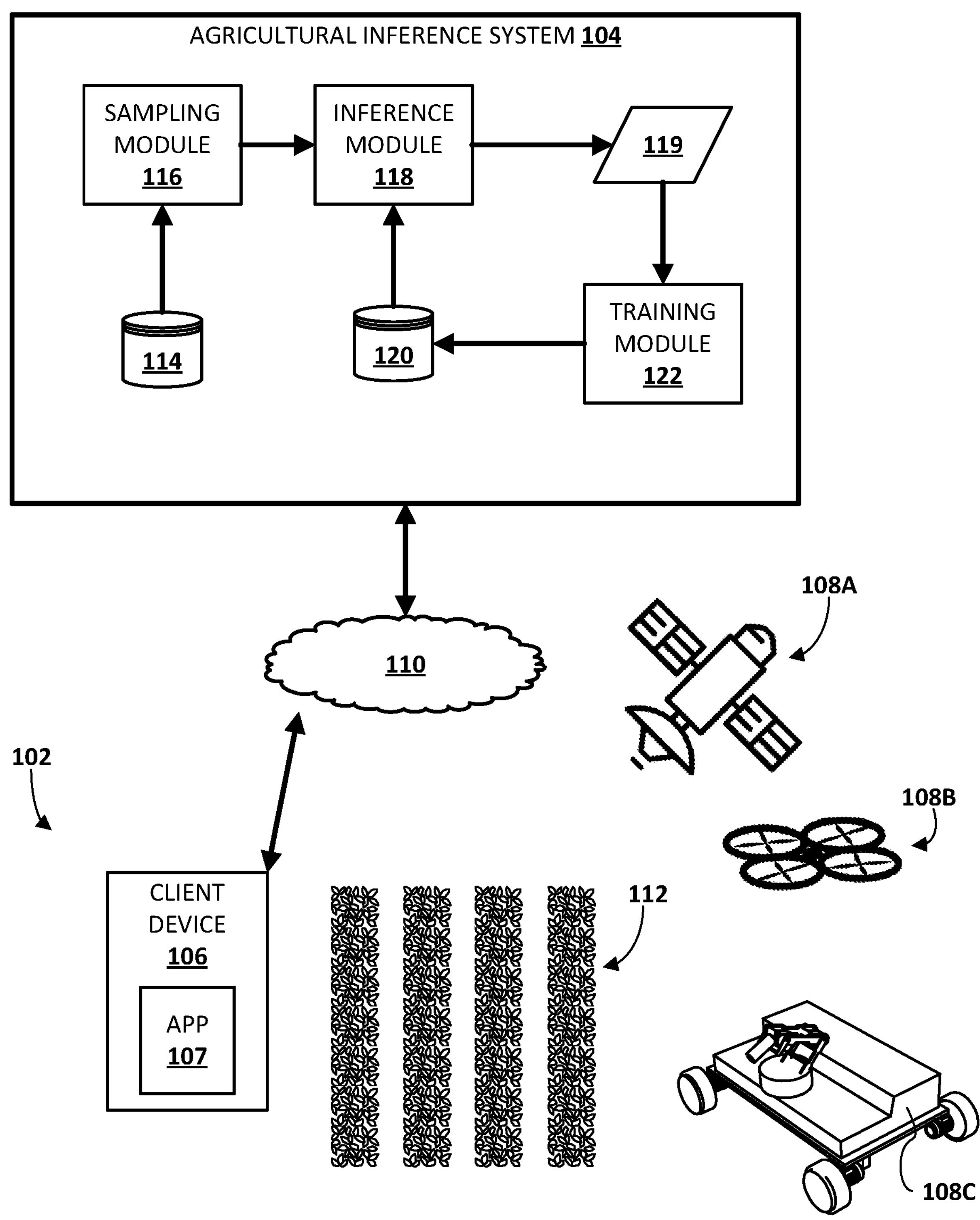
FIG. 1 schematically depicts an example environment in which disclosed techniques may be employed in accordance with various implementations.

Implementations are described herein for fusing multiple modalities of data into a multimodal feature embedding and then processing the multimodal feature embedding using various downstream processes to make various predictions about a parcel of land. Additionally, techniques are described herein for a two-stage pre-training process that includes: (i) pre-training a plurality of modality-specific encoders, e.g., using masked autoencoding, to generate respective embeddings, and (ii) pre-training a multimodal fusion machine learning model, e.g., alone or jointly with the modality-specific encoders using masked autoencoding (which may or may not be cross-modal), to generate the aforementioned multimodal feature embedding about the parcel of land. While examples described herein relate primarily to the agricultural context, including making predictions about crop yields and/or suitable crops for agricultural parcels, this is not meant to be limiting. Techniques described herein may be applicable in other contexts in which multiple modalities of data are captured about areas of land.

In various implementations, multiple modalities of data about an agricultural parcel may be obtained. These modalities may include, but are not limited to, remote sensing data such as satellite and/or aerial imagery, soil moisture data, soil composition data, climate data, agricultural practices data, terrain data, and so forth. Various modalities of data may take the form of time series data that is sampled at various frequencies. For instance, soil moisture data and/or climate may be sampled at relatively high frequencies, e.g., daily. Other modalities of data, such as soil composition or some types of remote sensing data, may be sampled much less frequently, e.g., weekly, monthly, or even once per crop cycle.

The modality-specific encoders may be trained, e.g., using masked autoencoding, to process data having temporal dimensions that correspond to the respective modality. For instance, if a particular satellite captures images of an agricultural parcel weekly, an encoder specific to that modality may be trained for time series data that is sampled on a weekly basis. Once trained, these modality-specific encoders can be used to process respective modalities of data to generate modality-specific embeddings.

The modality-specific embeddings may be processed using the aforementioned multimodal fusion machine learning model to generate multimodal feature embeddings about underlying agricultural parcels. During training, these multimodal feature embeddings may be used to train the multimodal fusion machine learning model, e.g., alone or jointly with the modality-specific encoders (e.g., using masked autoencoding). Once trained, the multimodal feature embeddings may be used for downstream purposes such as training and/or applying machine learning models (e.g., "heads") to make various agricultural predictions (e.g., crop yields), locating similar agricultural parcels where crops of various types were grown successfully (and/or unsuccessfully), and so forth.

In some implementations, the modality-specific embeddings may be used to predict other modalities of data that may be missing for a given parcel of land. For instance, if three of four modalities of data are available for an agricultural parcel, but soil composition data is not available, soil composition data can be predicted using the other modality-specific encoders, e.g., in conjunction with the multimodal fusion machine learning model. For instance, the multimodal fusion machine learning model may take the form of a generative model such as various types of transformers that are often used as large language models. The multimodal fusion machine learning model may be prompted with tokens indicative of the three available modalities of data and a requests (e.g., natural language) for the fourth, missing modality. The output may be, for instance, tokens indicative of the fourth modality of data.

The multimodal feature embedding generated using the multimodal fusion machine learning model may be used for a variety of purposes. In some implementations, it may be processed using one or more downstream machine learning models, or "heads," to make agricultural predictions about an agricultural parcel. These agricultural predictions may include, for instance, multi-crop yield forecasting about the agricultural parcel (e.g., predict x volume of corn, y volume of soybeans, etc.), suitable crops for the agricultural parcel, and so forth. In the latter case, the multimodal feature embedding may be used to identify reference multimodal feature embedding(s) that are sufficiently proximate to the multimodal feature embedding in embedding space. These reference multimodal feature embeddings may have been generated, e.g., by processing multiple different modalities of agricultural data about one or more reference agricultural parcels in which various crops were grown. Thus, for instance, if the multimodal feature embedding is proximate in embedding space to reference multimodal feature embeddings (or clusters thereof) that were generated from agricultural parcels used to grow both corn and soybeans, a recommendation may be provided that either corn or soybeans would be suitable crops to grow in the agricultural parcel in question.

FIG. 1 schematically illustrates one example environment in which one or more selected aspects of the present disclosure may be implemented, in accordance with various implementations. The example environment depicted in FIG. 1 relates to the agriculture domain, but this is not meant to be limiting. Techniques described here may be useful in any domain in which multiple different modalities of data can be fused to make inferences about, for instance, parcels of land.

The environment of FIG. 1 includes one or more farms 102 and an agricultural inference system 104. Farm 102 also includes one or more client devices 106 and one or more fields 112 (or more generally, "parcels") that are used to grow one or more crops. Field(s) 112 may be used to grow various types of crops that may produce plant parts of economic and/or nutritional interest. These crops may include but are not limited to everbearing crops such as strawberries, tomato plants, or any other everbearing or non-everbearing crops, such as soybeans, corn, lettuce, spinach, beans, cherries, nuts, cereal grains, berries, grapes, and so forth. One farm 102 is depicted in detail in FIG. 1 for illustrative purposes. However, there may be any number of farms for which agricultural inferences such as crop type classification.

An individual (which in the current context may also be referred to as a "user") may operate a client device 106 to interact with other components depicted in FIG. 1. Each client device 106 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus that includes a computing device, such as a head-mounted display ("HMD") that provides an AR or VR immersive computing experience, a "smart" watch, and so forth. Additional and/or alternative client devices may be provided.

Agricultural inference system 104 comprises a non-limiting example of a computing system on which techniques described herein may be implemented. Each of client devices 106 and agricultural inference system 104 may include one or more memories for storage of data and software applications, one or more processors for accessing data and executing applications, and other components that facilitate communication over a network. The computational operations performed by client device 106 and/or agricultural inference system 104 may be distributed across multiple computer systems. Client device 106 may operate a variety of different applications that may be used, for instance, to analyze various agricultural inferences. For example, client device 106 operates an application 107 (e.g., which may be standalone or part of another application, such as part of a web browser), which a user can use to view fields and farmland from overhead with annotations such as suitable crop type prediction, multi-crop yield forecasting, or other agricultural inferences, etc.

In various implementations, agricultural inference system 104 may include a sampling module 116, an inference module 118, and a training module 122. Agricultural inference system 104 may also include one or more databases 114, 120 for storing various data used by and/or generated by modules 116, 118, and/or 122. For example, database 114 may store multiple modalities of data such as satellite data captured by one or more satellites 108A, other sensor data gathered by farm equipment such as unmanned aerial vehicle (UAV) 108B and/or rover 108C, user-input data, weather data, soil data, and so forth. Database 120 may store machine learning models that are applied by inference module 118 to generate agricultural inferences by fusing multiple modalities of data and/or trained by training module 122. In some implementations one or more of modules 116, 118, and/or 122 may be omitted, combined, and/or implemented in a component that is separate from agricultural inference system 104, such as on client device 106. In some implementations, agricultural inference system 104 may be considered cloud-based computing resources as it may be implemented across one or more computing systems that may be referred to as the "cloud."

In some implementations, sampling module 116 may be configured to sample (e.g., retrieved, obtain, access etc.) multiple different modalities of data that are usable collectively to make various agricultural predictions, such as a prediction of a suitable crop to grow on a parcel of land (e.g., field 112) and/or a multi-crop yield forecast that includes predictions of yields that might be achieved for multiple different crops if grown in the parcel. These different modalities of data may include, for instance, time series satellite data captured by satellite 108A, soil moisture and/or composition data captured by rover 108C and/or by human personnel, weather data captured by weather sensors or obtained from weather databases/services, and so forth. Sampling module 116 may provide this sampled multimodal data to inference module 118. In some implementations, the sampled multimodal data may be processed, e.g., continuously, periodically, on demand, etc., by inference module 118, using one or more ML models stored in database 120 to generate output requested by one or more users.

Various types of machine learning models may be applied by inference modules 118 to generate various types of agricultural predictions and/or classifications. Additionally, various types of machine learning models may be used to generate semantically rich embeddings that are applied as input across the various machine learning models. These various machine learning models may include, but are not limited to, recurrent neural networks (RNNs), long short-term memory (LSTM) networks (including bidirectional), gated recurrent unit (GRU) networks, graph neural networks (GNNs), transformer networks (e.g., the same as or similar to those often used as large language models), feed-forward neural networks, convolutional neural networks (CNNs), support vector machines, random forests, decision trees, etc. For instance, various types of large language models (LLMs) may be employed, such as PaLM, BARD, BERT, LaMDA, Meena, GPT, and/or any other LLM, such as any other LLM that is encoder-only based, decoder-only based, sequence-to-sequence based and that optionally includes an attention mechanism or other memory. As used herein, a "transformer" may include, but is not necessarily limited to, a machine learning model that incorporates a "self-attention" mechanism, and that is usable to process an entire sequence of inputs at once, as opposed to iteratively.

Training module 122 may be configured to train various machine learning models described herein. These models may include those stored in database 120, such as suitable crop predictor models, multimodal fusion models, multi-crop yield forecasting models, etc., as well as other machine learning models that are employed to encode various modalities of input data into embeddings. In various implementations, training module 122 may be configured to train transformers and other types of models to generate agricultural predictions and classifications based on less than complete data. For example, and as will be described in more detail below, various modalities and/or segments of sampled input data may be masked, e.g., using masked autoencoding techniques, to train intramodal and multimodal encoders to generate embeddings that accurately represent features of a parcel of land, even when some data points are missing.

Figure 2:
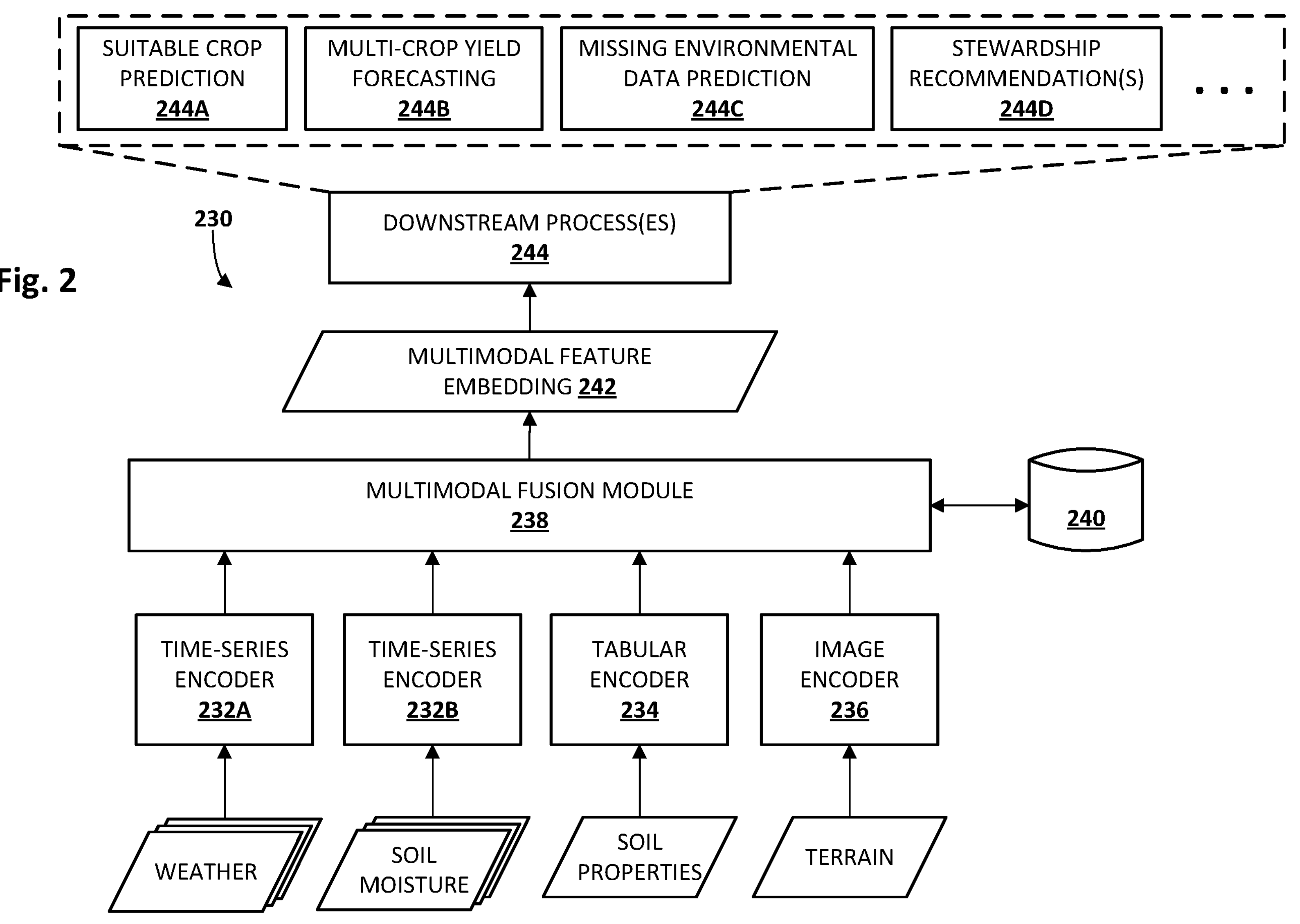
FIG. 2 schematically depicts a multimodal architecture and/or framework configured with selected aspects of the present disclosure.

FIG. 2 schematically depicts an example architecture/framework 230 on which selected aspects of the present disclosure may be implemented. Starting at bottom, various modalities of data related to a parcel of land may be obtained, e.g., by sampling module 116. These may include, from left to right, time series weather data, time series soil moisture data (e.g., soil samples captured daily by rover 108C), soil properties (which may be in tabular form in some instances), terrain data in the form of high elevation images such as satellite images captured by satellite 108A or aerial imagery captured by UAV 108B. These are merely meant as illustrative examples, and other combinations of the same modalities of data with different modalities of data may be provided.

A plurality of encoders (machine learning models) 232A, 232B, 234 and 236 are provided to process the various modalities of data depicted in FIG. 2. Any or all of these encoders may be trained in some implementations using masked autoencoding, as will be explained in more detail below. Thus, each encoder may, in various implementations, be part of a respective autoencoder (or "encoder-decoder") that also includes a corresponding decoder/decoder portion/layers. As will be discussed below, the decoders (not depicted in FIG. 2) may be used during various stages of training, but may be discarded or otherwise not used during inference. The encoders may be trained to generate informationally rich embeddings (not depicted in FIG. 2; e.g., continuous vector embeddings, discrete embeddings, etc.) that represent various features of the respective modalities of data.

A first time series encoder 232A may be trained to process time series weather data. A second time series encoder 232B may be trained to process time series soil moisture data. A tabular encoder 234 may be trained to process tabular data (e.g., data organized in rows and columns), e.g., such as soil properties. Soil properties may include, for instance, organic content, nitrogen content, texture (e.g., the proportion of sand, silt, or clay particles that comprise the mineral portion of the soil), porosity, structure, temperature, density, color, consistence/plasticity, and so forth. Thus, in a table of soil properties, one of the rows or columns may correspond to the soil property type, and the other of rows or columns may correspond to the soil property values. An image encoder 236 may be configured to process terrain data, such as satellite data captured by one or more satellites 108A and/or aerial imagery captured by one or more UAVs 108B.

The embeddings generated by encoders 232A-B, 234, 236 (and/or by other encoders where applicable) may be processed by a multimodal fusion module 238 (which in some cases may be part of inference module 118) based on a multimodal fusion modal 240 to generate a multimodal feature embedding 242. In various implementations, multimodal fusion model 240 may be stored along with other machine learning models described herein in database 120. Multimodal feature embedding 242 may encode or otherwise represent features from all the various modalities of environmental data that are processed by encoders 232A-B, 234, 236. Put another way, by encoding the various different embeddings generated by encoders 232A-B, 234, 236 into a single multimodal feature embedding 242, multimodal fusion module is effectively "fusing" the different modalities of environmental data together.

Multimodal feature embedding 242 may be used for a variety of purposes. As will be explained in more detail with regard to FIG. 4, during a second training phase, multimodal feature embedding 242 may be used by training module 122 to train, alone or jointly with encoders 232A-B, 234, 236, multimodal fusion model 240 to generate better multimodal feature embeddings 242 that more accurately reflect as many features of a parcel of land as possible, even with incomplete and/or noisy input data. The more accurate multimodal feature embeddings 242, the more accurate agricultural predictions can be made by one or more downstream processes 244.

Downstream processes 244 that make use of multimodal feature embedding 242 may take a variety of forms, some non-limiting examples of which are depicted. These downstream processes may be implemented using any combination of hardware and software, and in the latter case may be implemented using any combination of rules-based or heuristics-based logic, statistical analysis, machine learning, etc. For instance, one or more "prediction heads"—e.g., additional layers of a neural network that are trained for a particular task—may be trained to process multimodal feature embedding 242 to make a variety of different predictions.

In some implementations, a suitable crop prediction process 244A may take the form of a prediction head that is trained to generate a probability distribution over a plurality of different crop types (or "classes"), such as corn, wheat, sorghum, soy, sugar beet, etc. A suitable crop for growing in the parcel may be selected based on these probabilities.

In some implementations, a multi-crop yield forecasting process 244B may take the form of a multitask prediction head that is trained to generate a plurality of crop yield predictions for a plurality of different crop types. Alternatively, multi-crop yield forecasting process 244B may include a plurality of individual crop yield prediction heads, one for each of a plurality of different crop types.

A missing environmental data prediction process 244C may take the form of a prediction head that is trained to predict a particular environmental condition that is absent from input, given a plurality of other modalities of data. As will be explained in more detail with relation to FIG. 4, missing environmental data prediction process 244C may in some cases take the form of a decoder that is trained to decode multimodal feature embedding 242 and generate a prediction of a particular modality of data (e.g., that is masked during training).

A stewardship recommendation(s) process 244D may take the form of a prediction head that is trained to generate a probability distribution over a plurality of candidate agricultural actions. These agricultural actions may include, for instance, application of chemicals such as fertilizer, herbicide, and/or pesticide, increasing/decreasing irrigation, crop type selection, tillage type selection, seed genotype selection, crop rotation selection, and so forth. The output generated based on such a prediction head may be used, e.g., by stewardship recommendation(s) process 244D, to recommend one or more agricultural actions to be taken on the parcel of land.

As indicated by the ellipses, any number of other downstream processes 244 may be provided. These downstream processes (and techniques described herein) are not limited to the agricultural context. More generally, downstream processes 244 and techniques described herein may be implemented in any domain in which multiple modalities of data about a parcel of land can be used to make various predictions about the parcel of land. These domains can include, but are not limited to, real estate speculation, insurance, construction planning, urban planning, and so forth.

Figures 3A, 3B:
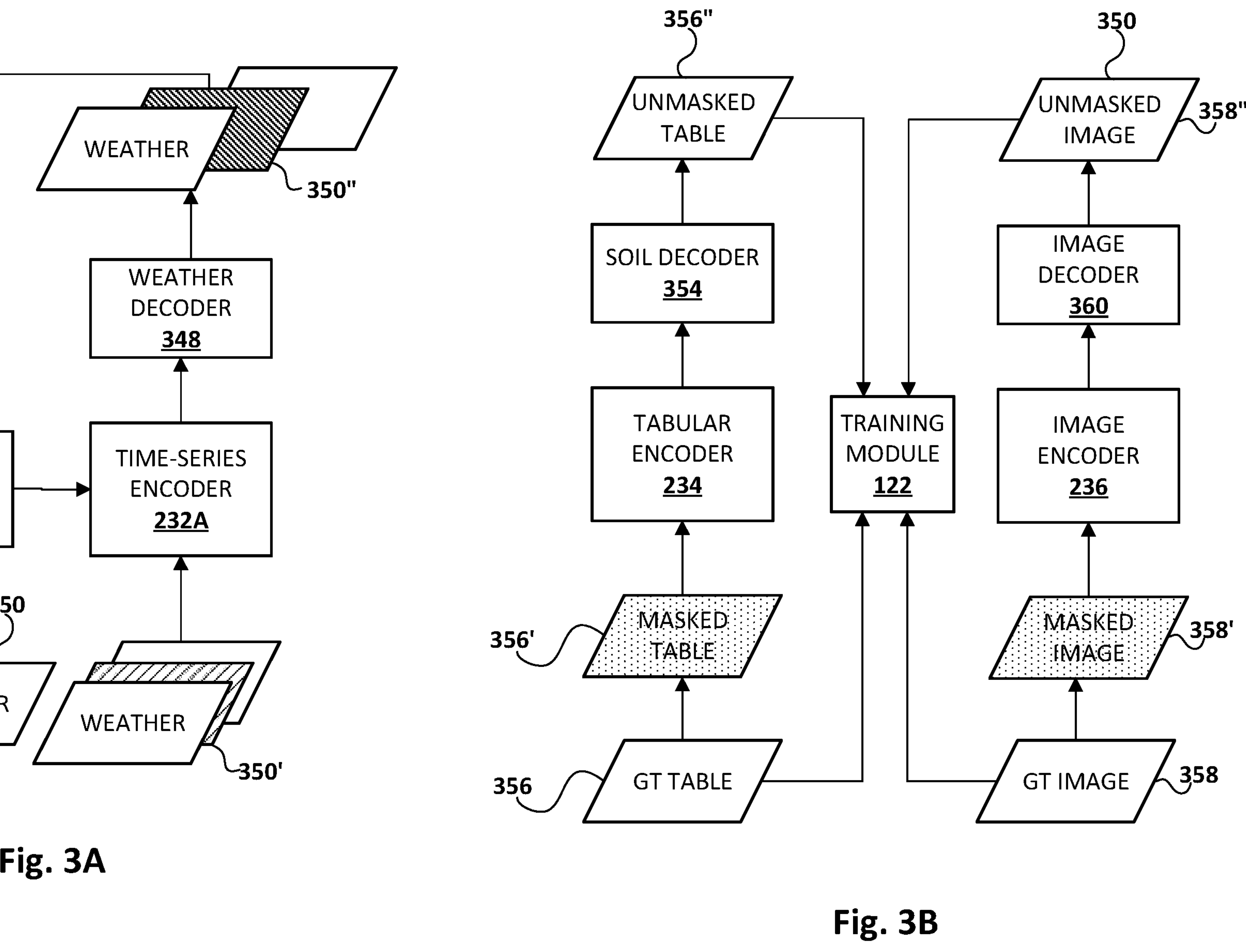
FIG. 3A and FIG. 3B schematically depict examples of pretraining intramodal encoders in a first phase, in accordance with various embodiments.

In various implementations, the various machine learning models depicted in FIG. 2 may be trained in multiple phases. FIGS. 3A and FIG. 3B schematically illustrate example(s) of how intramodal encoders 232A-B, 234, and 236 can be trained using masked autoencoding during the first phase.

In FIG. 3A, first time-series encoder 232A is depicted being trained. Weather time-series data is partially masked so that a ground truth weather sample 350 is replaced with a masked sample 350'. The weather time-series data, including the masked sample 350', is processed using first time-series encoder 232A to generate (not depicted) a weather embedding or intermediate representation. The weather embedding is then decoded using a weather encoder 348, which along with first time-series encoder 232A may form a weather time-series autoencoder. Using weather decoder 348, predicted weather time series data is generated, including a predicted weather sample 350" in place of the masked weather sample 350' that was provided as input. The predicted weather sample 350" may then be compared by training module 122 with ground truth weather sample 350 to determine an error. Based on this error, a loss function associated with time-series encoder (and weather decoder 348 in some instances) may be minimized, e.g., using techniques such as gradient descent, back propagation, cross entropy, etc. While not shown in FIG. 3A, in various implementations, second time-series encoder 232B may be trained in a similar fashion, except with soil moisture time-series data instead of weather time-series data. Other time-series encoders may be trained similarly.

In FIG. 3B, ground truth (GT) tabular data 356 related to soil composition may be at least partially masked to generate masked table data 356'. For instance, data in one or more rows, columns, individual cells, etc., may be replaced with null, zeroes, fake values, etc. Masked table data 356' may then be processed using tabular encoder 234 to generate an embedding or intermediate representation (not depicted) that can then be decoded by a tabular decoder 354 to predict unmasked tabular data 356". In some implementations, tabular encoder 234 and tabular decoder 354 may together form a tabular autoencoder. In various implementations, training module may compare unmasked tabular data 356" to ground truth tabular data 356 to determine an error. Based on this error, training module 122 may train tabular encoder 234 and/or decoder 354, e.g., by minimizing their loss function(s) using techniques such as gradient descent, back propagation, cross entropy, etc.

FIG. 3B depicts a similar process for image encoder 236. In various implementations, ground truth (GT) image(s) 358 may be masked—e.g., various pixels and/or regions of pixels may be replaced with null values, zeroes, etc. —to generate masked image(s) 358'. Masked image(s) 358' may then be processed, e.g., by inference module 118 using image encoder 236, to generate an embedding or intermediate representation (not depicted) than can then be decoded by an image decoder 360 to generate a predicted unmasked image(s) 358". In various implementations, image encoder 236 and image decoder 360 may together form an image autoencoder. Training module 122 may then compare predicted unmasked image(s) 358" with ground truth image(s) 358 to determine an error that can be used to train image encoder 236 and/or decoder 360.

In some implementations, in addition to or instead of comparing the predicted unmasked image 358" to ground truth image(s) 358, training module 122 may compare a ground truth embedding generated by processing ground truth image(s) 358 using image encoder 236 to the embedding generated by processing masked image(s) 358'. Based on this comparison, training module 122 may train image encoder 236 using contrastive training techniques such as triplet loss.

Figure 4:
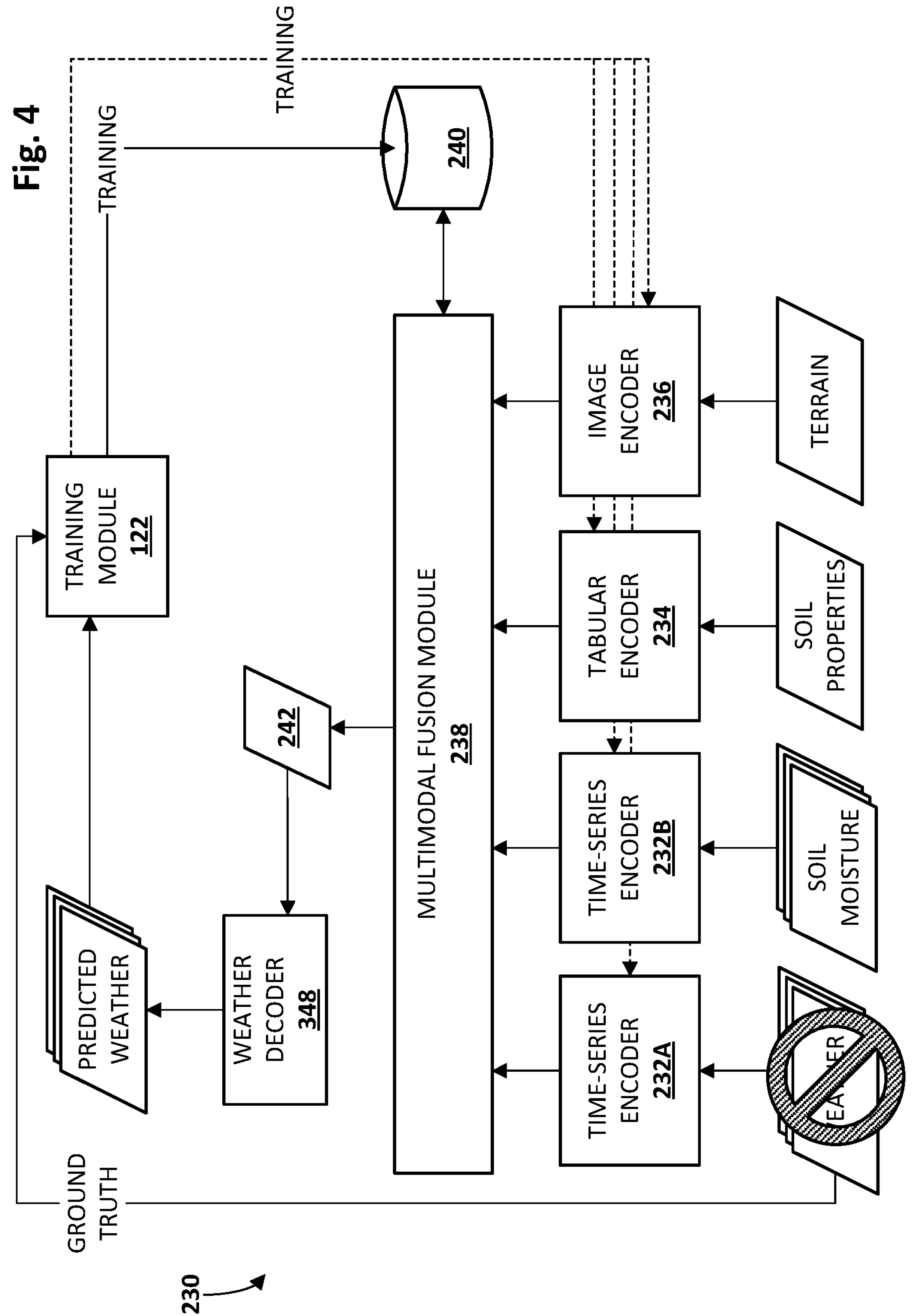
FIG. 4 schematically depicts an example of training a multimodal fusion model in a second phase, in accordance with various embodiments.

FIG. 4 depicts a second phase in which multimodal fusion model 240 is trained, alone or in conjunction with encoders 232A-B, 234, 236. In the example of FIG. 4, weather data is at least partially masked, and the other modalities of data are left unmasked. However, this is not meant to be limiting. Other modalities of data may be masked in addition to or instead of weather data. For instance, as multimodal fusion model 240 approaches an acceptable level of predictive accuracy, multiple modalities may be masked at once.

In FIG. 4, the various modalities of data, including the at least partially masked weather data, are processed, e.g., by inference module 118 (not depicted in FIG. 4) using encoders 232A-B, 234, and 236, as described previously. The respective intramodal embeddings (not depicted) may be processed as inputs by multimodal fusion module 238 based on multimodal fusion model 240 to generate multimodal feature embedding 242, as described in relation to FIG. 2. Weather decoder 348 may then be used to process multimodal feature embedding 242 to generate predicted weather time series data.

Similar to what was described in FIG. 2, and as shown by the solid arrows, training module 122 may compare the predicted weather time series data with the ground truth weather time series data that was at least partially masked. Based on this comparison, training module may seek to minimize a loss function associated with multimodal fusion model 240, e.g., using techniques such as gradient descent, back propagation, cross entropy, etc. In some implementations, intramodal encoders 232A-B, 234, and/or 236 may be jointly trained with multimodal fusion model 240, as shown by the dashed arrows in FIG. 4. In this way, each modality's encoder may "learn" information from other modalities and be trained to generate more robust multimodal feature embeddings that are usable to make sufficiently accurate predictions with less-than-complete data, which is often the case in agricultural scenarios.

FIG. 5 illustrates a flowchart of an example method 500 for practicing selected aspects of the present disclosure, particularly training a single machine learning model such as a transformer to generate in-season predictions based on temporally disparate time series input data. For convenience, operations of method 500 will be described as being performed by a system configured with selected aspects of the present disclosure. Other implementations may include additional operations than those illustrated in FIG. 5, may perform operation(s) of FIG. 5 in a different order and/or in parallel, and/or may omit one or more of the operations of FIG. 5.

At block 502, the system, e.g., by way of sampling module 116, may obtain multiple different modalities of agricultural data about an agricultural parcel. In FIGS. 2-4, for instance, weather time series data, soil moisture time series data, soil properties tabular data, and terrain high-elevation images are obtained. These examples are not meant to be limiting, and various subsets of these modalities may be combined with other modalities to practice selected aspects of the present disclosure.

At block 504, the system, e.g., by way of inference module 118, may process each modality of agricultural data based on a respective modality-specific encoder (e.g., 232A-B, 234, 236) to generate a respective (intramodal) embedding. In various implementations, the respective modality-specific encoder may be pre-trained for that modality using masked autoencoding, as shown in FIGS. 3A-B, for instance.

At block 506, the system, e.g., by way of inference module 118 and/or multimodal fusion module 238 (which may be the same or combined in some cases), may process the plurality of (intramodal) embeddings based on a multimodal fusion machine learning model (e.g., 240) to generate a multimodal feature embedding (e.g., 242) that represents the agricultural parcel.

This multimodal feature embedding 242 may be a rich representation of numerous features of the underlying parcel of land. Accordingly, at block 508, the system, e.g., by way of one or more downstream processes 244A, 244B, . . . , may process the multimodal feature embedding to generate one or more agricultural predictions about the agricultural parcel. For example, at block 508A, the system may identify reference multimodal feature embeddings that are sufficiently proximate (e.g., determined using techniques such as cosine similarity, Euclidean distance, etc.) to multimodal feature embedding 242 in embedding space. Features of parcels of land underlying those most proximate multimodal feature embeddings may then be considered. For example, if the most proximate multimodal feature embeddings represent parcels of land used to grow corn successfully, then corn may be predicted as a suitable crop for growing in the parcel of land at issue. As another example, at block 508B, the system may process the multimodal feature embedding 242 using a downstream machine learning model (e.g., one of the aforementioned prediction heads) to perform multi-crop yield forecasting for the agricultural parcel.

At block 510, the system may cause one or more computing devices to render output that includes one or more of the agricultural predictions. For example, the system may provide markup language document(s) or other data (e.g., HTML, XML) to client device 106, which may cause application 107 to render audible or visual output that conveys one or more of the agricultural predictions.

Figure 6:
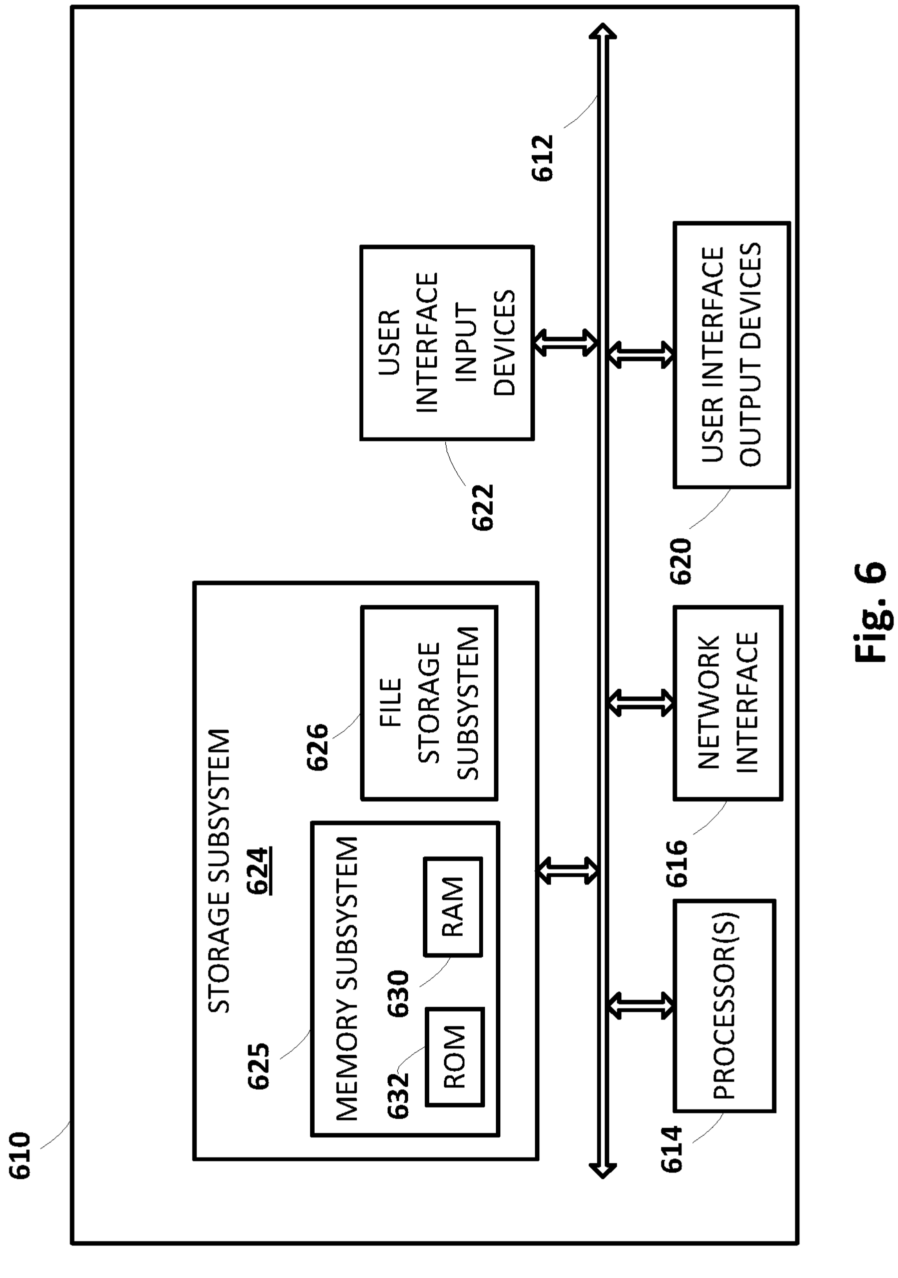
FIG. 6 schematically depicts an example architecture of a computer system.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In some implementations in which computing device 610 takes the form of a HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, one or more displays forming part of a HMD, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the method 500 described herein, as well as to implement various components depicted in FIGS. 1-4.

These software modules are generally executed by processor 614 alone or in combination with other processors. Memory 625 used in the storage subsystem 624 can include a number of memories including a main random-access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:

obtaining multiple different modalities of agricultural data about an agricultural parcel corresponding to a first time;

processing a first modality of agricultural data based on a first modality-specific encoder to generate a first modality-specific embedding and a second modality of agricultural data based on a second modality-specific encoder to generate a second modality-specific embedding, wherein the first and second modality-specific encoders are pre-trained for the first and second modalities of agricultural data, respectively, using masked autoencoding;

processing a plurality of the modality-specific embeddings based on a multimodal fusion machine learning model to generate a multimodal feature embedding that represents the agricultural parcel, the plurality of the modality-specific embeddings including the first modality-specific embedding and the second modality-specific embedding;

generating a third modality of agricultural data using the multimodal feature embedding, the third modality of agricultural data different than the multiple different modalities of agricultural data;

generating, using one or more downstream computer processes, one or more agricultural predictions about the agricultural parcel based on the multimodal feature embedding, the one or more agricultural predictions to include agricultural data corresponding to a second time, the second time different than the first time; and causing one or more computing devices to render output that includes one or more of the agricultural predictions.

2. The method of claim 1, wherein the multimodal fusion machine learning model is jointly trained with at least some of the first or second modality-specific encoders.

3. The method of claim 2, wherein the multimodal fusion machine learning model is jointly trained using the masked autoencoding.

4. The method of claim 1, wherein the multimodal fusion machine learning model includes a transformer.

5. The method of claim 1, wherein the multiple different modalities of data include at least one modality that includes agricultural time series data about the agricultural parcel.

6. The method of claim 5, wherein the agricultural time series data about the agricultural parcel includes soil moisture data.

7. The method of claim 5, wherein the agricultural time series data about the agricultural parcel includes climate data.

8. The method of claim 1, wherein the multiple different modalities of data include at least one modality that includes tabular data about the agricultural parcel.

9. The method of claim 8, wherein the tabular data includes soil properties of the agricultural parcel.

10. The method of claim 1, wherein the multiple different modalities of data include at least one modality that includes satellite or aerial imagery of the agricultural parcel.

11. The method of claim 1, wherein one or more of the downstream computer processes includes identifying one or more reference multimodal feature embeddings that are sufficiently proximate to the multimodal feature embedding in an embedding space, wherein the one or more reference multimodal feature embeddings were generated by processing the multiple different modalities of agricultural data about one or more reference agricultural parcels.

12. The method of claim 11, wherein the output includes a recommendation of a suitable crop for the agricultural parcel, wherein the suitable crop is selected based on having been grown in the one or more reference agricultural parcels.

13. The method of claim 1, wherein one or more of the downstream computer processes includes processing the multimodal feature embedding using a downstream machine learning model to perform multi-crop yield forecasting for the agricultural parcel.

14. A system comprising one or more processors and memory storing instructions that, in response to execution by the one or more processors, cause the one or more processors to:

obtain multiple different modalities of agricultural data about an agricultural parcel corresponding to a first time;

process a first modality of agricultural data based on a first modality-specific encoder to generate a first modality-specific embedding and a second modality of agricultural data based on a second modality-specific encoder to generate a second modality-specific embedding, wherein the first and second modality-specific encoders are pre-trained for the first and second modalities of agricultural data, respectively, using masked autoencoding;

process a plurality of the modality-specific embeddings based on a multimodal fusion machine learning model to generate a multimodal feature embedding that represents the agricultural parcel, the plurality of the modality-specific embeddings including the first modality-specific embedding and the second modality-specific embedding;

generate a third modality of agricultural data using the multimodal feature embedding, the third modality of agricultural data different than the multiple different modalities of agricultural data;

generate, using one or more downstream computer processes, one or more agricultural predictions about the agricultural parcel based on the multimodal feature embedding, the one or more agricultural predictions to include agricultural data corresponding to a second time, the second time different than the first time; and cause one or more computing devices to render output that includes one or more of the agricultural predictions.

15. The system of claim 14, wherein the multimodal fusion machine learning model is jointly trained with at least some of the first or second modality-specific encoders.

16. The system of claim 15, wherein the multimodal fusion machine learning model is jointly trained using the masked autoencoding.

17. The system of claim 14, wherein the multimodal fusion machine learning model includes a transformer.

18. The system of claim 14, wherein the multiple different modalities of data include at least one modality that includes agricultural time series data about the agricultural parcel.

19. A method implemented using one or more processors, comprising:

obtaining multiple different modalities of agricultural data about an agricultural parcel corresponding to a first time;

masking one or more of the multiple different modalities of agricultural data;

processing a remaining first modality of agricultural data based on a first modality-specific encoder to generate a first modality-specific embedding and a remaining second modality of agricultural data based on a second modality-specific encoder to generate a second modality-specific embedding, wherein the first and second modality-specific encoders are pre-trained for the remaining first and second modalities of agricultural data, respectively, using masked autoencoding;

processing a plurality of the modality-specific embeddings based on a multimodal fusion machine learning model to generate a multimodal feature embedding that represents the agricultural parcel, the plurality of the modality-specific embeddings including the first modality-specific embedding and the second modality-specific embedding;

generating a third modality of agricultural data using the multimodal feature embedding, the third modality of agricultural data different than the multiple different modalities of agricultural data;

generating, using one or more downstream computer processes, one or more agricultural predictions about the agricultural parcel based on the multimodal feature embedding, the one or more agricultural predictions to include agricultural data corresponding to a second time, the second time different than the first time;

comparing the one or more agricultural predictions to one or more ground truth observations; and training the multimodal fusion machine learning model based on the comparing.

20. The method of claim 19, further including jointly training one or more of the first or second modality-specific encoders based on the comparing.

* * * * *